United States Patent Office 2,741,640
Patented Apr. 10, 1956

2,741,640

MANUFACTURE OF CHLORINATED COMPOUNDS

Morton Kleiman, Chicago, Ill., assignor to Velsicol Chemical Corporation, a corporation of Illinois No Drawing. Application June 13, 1950,
Serial No. 167,922

2 Claims. (Cl. 260—648)

This invention relates to the chlorination of 4,5,6,7,8,8-hexachloro-3a,4,7,7a-tetrahydro-4,7-methanoindene, hereinafter termed chlordene, and to the material resulting therefrom. More specifically, this invention relates to a novel means of chlorinating chlordene with chlorine, namely in the presence of silica catalyst with the attendant advantages hereinafter described.

It is one object of the present invention to provide a new and improved method for preparing 1,4,5,6,7,8,8-heptachloro-3a,4,7,7a-tetrahydro-4,7-methanoindene by directly chlorinating chlordene with chlorine specifically in the presence of said catalyst.

Another object of the present invention is to provide a means for chlorinating chlordene with chlorine so as to directionalize the reaction and greatly increase the amount of the more insecticidally toxic material, 1,4,5,6,7,8,8-heptachloro-3a,4,7,7a-tetrahydro-4,7 - methanoindene in the reaction product mixture over that which may be formed when chlordene is chlorinated by means heretofore used.

Another object of this invention is to increase chlorination by substitution and diminish chlorination by addition when reacting chlordene with chlorine.

Another object of this invention is to provide a very rapid or accelerated method for chlorinating chlordene with chlorine without necessitating the use of elevated temperatures and without danger of discoloration or decomposition by the use thereof.

Another object is to provide a rapid means for chlorinating chlordene without using excess chlorine.

These and other objects and advantages of the present invention will be apparent from the following specification.

Broadly the present invention relates to a novel and improved method for chlorinating chlordene, namely chlorinating chlordene with chlorine in the presence of silica as a catalyst.

Chlordene, the starting material in the process herein disclosed, is that material resulting from the Diels-Alder adduction of hexachlorocyclopentadiene and cyclopentadiene in accordance with the following equation:

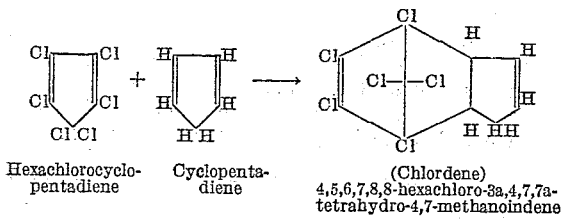

Hexachlorocyclo-    Cyclopenta-    (Chlordene)
pentadiene          diene      4,5,6,7,8,8-hexachloro-3a,4,7,7a-
                               tetrahydro-4,7-methanoindene According to "The Ring Index" by Patterson and Capell, A. C. S. Monograph Series, No. 84, 1940, dicyclopentadiene, $C_{10}H_{12}$ is described as 4,7-methano-3a,4,7,7a-tetrahydroindene. Following this accepted system of nomenclature, the adduct of hexachlorocyclopentadiene and cyclopentadiene would be described as 4,5,6,7,8,8-hexachloro-3a,4,7,7a-tetrahydro-4,7-methanoindene.

Chlordene can be prepared simply by intermixing hexachlorocyclopentadiene and cyclopentadiene, preferably in the absence of additional solvent. The reaction proceeds in a satisfactory manner at room temperature and also may be accomplished at cooler or more elevated temperatures. The reaction is somewhat exothermic and the temperatures thereof should be controlled such that temperatures not exceeding about 200° C. and preferably not exceeding about 100–120° C. are maintained throughout the course of the reaction. The reactants may be utilized in a molar ratio of 1:1; however, an excess of either reactant can be present. The reaction product, namely the adduct of hexachlorocyclopentadiene and cyclopentadiene, is crystalline in nature and may be purified by recrystallization from a solvent such as methanol.

Thus, as a specific method for preparing the aforementioned adduct, hexachlorocyclopentadiene may be placed in a vessel equipped with a mechanical stirrer, thermometer and reflux condenser. The hexachlorocyclopentadiene may then be heated to about 70° C. and have added thereto in a portionwise manner an equal molar quantity of cyclopentadiene. The reaction temperature may be maintained at about 70–85° C. After the cyclopentadiene has been completely added, the stirring may be continued for several hours. The crystalline material thus formed may be purified by recrystallization one or more times from methanol.

While a general and specific method for preparing chlordene has been above presented, it is expressly stated that the present invention is not dependent on those or any particular source or origin of chlordene; and the present process can be applied to the material having the chemical structure represented for chlordene regardless of its derivation or method of manufacture and the chlordene may be employed in either substantially pure form or in the form of a crude reaction mixture resulting from the aforesaid or other process for manufacture thereof.

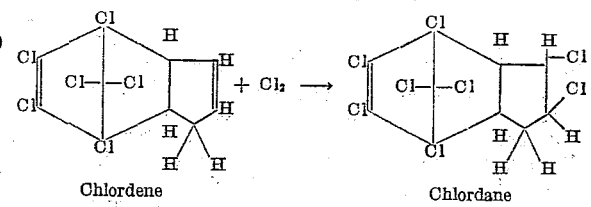

Chlordene                          Chlordane

When chlorinating chlordene to form chlordane, in addition to obtaining saturation of the double bond, as shown above, a limited amount of chlorination by substitution occurs as a side reaction. The hydrogen atoms of carbon atom No. 1 in chlordene which is allylic, are themselves somewhat activated, and it is the hydrogens attached to this carbon atom which are more easily substituted by chlorine during the chlorination reaction for the purpose of forming chlordane. This chlorination by substitution can occur in a molecule to the exclusion of chlorination by addition, or both chlorination by addition and substitution can occur in the same molecule. Thus, chlorination of chlordene with chlorine in the absence of catalyst, while producing preponderant amounts of chlordane, also may produce, as side products, the following two materials represented by structural formulas and hereinafter referred to as heptachlor and nonachlor, respectively:

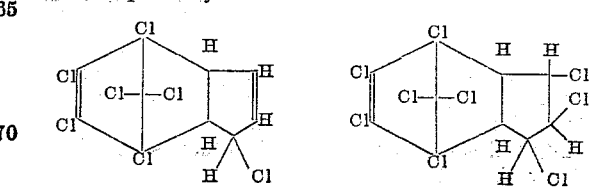

While other materials may be produced from the chlorination of chlordene with chlorine, they are relatively minor with respect to the amount of heptachlor or nonachlor usually produced, and are certainly negligible as compared to the amount of chlordane produced.

Of the three materials heretofore stated to be obtainable from the chlorination of chlordene with chlorine, by far the most potent one as an insecticide is heptachlor. It is, therefore, greatly advantageous to be able to directionalize the chlorination of chlordene to form increased amounts of heptachlor. Alternatively stated, it is advantageous to directionalize the chlorination of chlordene with chlorine to greatly enhance chlorination by substitution with a substantial diminution of chlorination by addition as compared to that obtainable by prior methods.

The chlorination of chlordene with chlorine in the absence of a catalyst proceeds very slowly at lower temperatures such as those approaching normal room temperature or lower. Consequently, to maintain a practicable rate of reaction, somewhat elevated temperatures such as about 70° C. or even higher are generally and preferably used to complete the reaction in a reasonable period. The reaction time required to react a mole of chlorine per mole of chlordene at about 70° C. in the absence of catalyst may require as much time as 5–6 hours. The use of such elevated temperatures to increase the rate of reaction is disadvantageous for at least two reasons. Firstly, the chlordene and chlorinated products thereof may tend to discolor on being subjected to elevated temperatures for protracted periods, and secondly, the cost of maintaining reactants at elevated temperatures and maintaining temperature control must be considered.

The ordinary chlorination of chlordene with chlorine at temperatures such as room temperature is very slow and thus is not economical. For example, a reaction mixture of equimolar amounts of chlordene and chlorine dissolved in carbon tetrachloride is not completely reacted even after 24 hours. The reaction rate at room temperature may be somewhat increased by utilizing a large excess of chlorine such as by constantly bubbling chlorine gas through the reaction mixture, but this is not advantageous in that either a large amount of chlorine gas is wasted or else a recovery system for the gas must be provided, operated, and maintained. In addition, a large excess of chlorine promotes the formation of excessively chlorinated side products of decreased value.

A usual method generally employed for obtaining chlorination by substitution in preference to chlorination by addition is to carry out the chlorination at very high temperatures, usually in the vapor phase. This usual method cannot be applied to chlordene, however, because the temperatures required for a vapor phase chlorination would cause the reactant and products to decompose. The present invention contemplates a method completely different from the usual method above stated for effecting substitution chlorination rather than addition chlorination in chlordene.

As hereinbefore stated, the present invention relates to an improved method for chlorinating chlordene, namely, chlorination of chlordene with chlorine in the presence of silica as a catalyst.

Since chlordene decomposes before it volatilizes, under ordinary pressures, the catalytic chlorination herein contemplated is effected in the liquid phase with the chlordene preferably dissolved in a suitable solvent. The use of any particular solvent is not critical, it being desirable, however, that the solvent used be substantially unreactive with chlorine under the reaction conditions used. Exemplary of solvents which may be used with excellent results are carbon tetrachloride, chloroform, tetrachloroethane, hexachlorethane, nitrobenzene, Freon, or like halogenated organic or otherwise relatively inert solvents. Other solvents which can be used with substantially equal facility will naturally be suggested to those skilled in the halogenation art.

The amount of solvent used is not critical. It is preferred that there be a sufficient amount used to completely dissolve the chlordene. An excess of solvent, i. e. more than is sufficient to dissolve the reactants may be used without harmful results; however, a very large excess should be avoided so as to minimize the size of the reaction vessel and so as to avoid diminution of the rate of reaction because of excessive dilution of the reactants.

The catalyst used has been defined as silica which has the chemical formula $SiO_2$. Preferably, the catalyst should be activated, i. e. granular, adsorptive, porous and possessing a relatively high ratio of surface to mass. Thus, the types of silica ordinarily termed "silica gel" and activated silica which are relatively porous, in a finely divided state are preferred catalysts.

It is desirable that the catalyst surface be intimately contacted with the reaction mixture. Therefore, a relatively small particle size presenting a large surface in proportion to mass is preferred. While the preferred particle size may vary depending on the amount of catalyst used and the size and type of reactor utilized, under usual conditions, a catalyst having a particle size of less than about 50 mesh is preferred.

In the present process, the silica acts as a true catalyst. That is, the process is effected by and operable with amounts of catalyst which are ordinarily termed "catalytic amounts." Thus, an amount of silica, representing only about 0.5% by weight of the chlordene chlorinated gave very satisfactory results both as to increasing the yield of heptachlor and increasing the rate of reaction. Conversely, much larger amounts of catalyst can be used, such as, for example, an amount equivalent to about 25% by weight of the chlordene chlorinated. There does not appear to be a maximum limit as to the quantity of catalyst which can be used; however, to avoid obtaining a thick slurry which is difficult to manage, and in the interests of economy, it is recommended that for convenience silica in the amount of less than 10% by weight of the chlordene reactant be used.

Since the principal product desired is heptachlor, it is preferred that about a stoichiometric amount of chlorine with respect to chlordene be used to produce said principal product. Thus, the optimum ratio of reactants, namely of chlorine to chlordene is about 1 to 1 or about equimolar. While less than an equimolar amount of chlorine based on chlordene may be used, it is uneconomical to do so since this will result in incomplete reaction of the chlordene, thereby contaminating the product with reactant. The use of large excesses of chlorine is undesirable in that it is wasteful of chlorine and further may lead to the production of undesirable side products. It will be noted that the amount of chlorine introduced into the reaction chamber is not critical provided the reaction is terminated when about 0.75 to about 1.25 mole equivalents of chlorine have reacted per equivalent of chlordene although it is preferred that substantially equal molar proportions react.

The reaction mixture, namely, a solvent, chlordene, chlorine and silica may be added together in any order or sequence. One method, is to dissolve the chlordene in solvent, add the silica and then add the chlorine. Variations of this procedure are, however, satisfactory.

As heretofore stated, the catalytic reaction of the present invention proceeds quite rapidly. Ordinarily, not more than an hour is required for the reaction to proceed to completion, and generally, even a lesser time than this is sufficient. By the reaction having proceeded to completion is meant that point at which about a mole of chlorine has reacted with a mole of chlordene, or if less than a mole of chlorine per chlordene is present, the point where substantially all the chlorine has reacted. Excessive reaction periods are not harmful, especially where equimolar or less quantities of chlorine based on chlordene are used. Chlordene, in the presence of 25% excess chlorine was allowed to react for an extended period, namely three hours in the presence of silica and still a preponderant yield of heptachlor was obtained. At high temperatures, it is undesirable to unduly prolong the reaction time where large excesses of chlorine are present because of the possibility of reactions between heptachlor originally formed and the excess chlorine to form other, less desirable products.

It is a simple matter to trace the reaction and determine the extent of its completion by titrating aliquot portions of the reaction mixture as the reaction progresses to determine the amount of unreacted chlorine contained therein.

The present catalytic reaction can be carried out over a fairly broad range. Thus, temperatures as high as about 50° C. are satisfactory whereas very low temperatures such as for example about −35° C., depending on the freezing point of the solvent used, also produces effective and satisfactory results. A preferred range which is economical and conducive to the production of quality product is about 0 to about 30° C.

Exemplary of the general method employed in the present process, chlordene is dissolved in a solvent and silica catalyst is added thereto. Maintaining this mixture at the desired temperature, chlorine gas is introduced into the mixture with stirring. A molar equivalent of chlorine, based on chlordene can generally be introduced at a relatively rapid rate without any loss of chlorine and without resorting to pressure vessels. Any technique known to the art for reacting a measured amount of chlorine with a liquid reactant under the present conditions is satisfactory. The course of the reaction can be traced by titrating aliquots of the mixture as hereinbefore stated. When the reaction is completed, catalyst can be removed by decantation, filtration, or like means; hydrogen chloride, any excess chlorine and solvent may be removed from the product by any means known to the art such as alkaline wash followed by distillation at reduced pressure if desired. Where both excess chlorine and solvent are removed by distillation, it is preferred that the removal be accomplished at reduced pressure to avoid prolonged reaction periods at elevated temperatures. Alternatively, the chlorine can be removed by stripping with an inert gas such as nitrogen. The product which is rich in its heptachlor component can be used as such without further treatment. Alternatively the heptachlor can be purified by recrystallization from a suitable solvent or by chromatographic means. Suitable solvents for purifying the heptachlor product are methanol, butanol, pentane, hexane, etc. Other suitable solvents will be suggested to one skilled in the art.

To more clearly understand the present catalytic process and for a better appreciation of the advantages thereof, the following examples are presented for the purpose of illustration and not limitation. The first and second examples show the process of chlorinating chlordene in the presence of and the third example in the absence of catalyst for comparative purposes. The quantities used are parts by weight unless otherwise specified.

*Example I*

To 33.9 parts of chlordene dissolved in 163 parts of carbon tetrachloride was added 1.7 parts (5 wt. percent based on chlordene) ground silica gel which had been dried for 24 hours at 120° C. Gaseous chlorine, in the amount of 7.46 parts was bubbled into the agitated heterogeneous mixture over a period of about 20 minutes, with said mixture being maintained at about 25° C. Chlorine was prevented from escaping from the reaction vessel by means of a Dry Ice trap which condensed and returned the chlorine thereto. Substantially no chlorine escaped from the reaction vessel as determined by titrating an alkaline solution in a trap through which any escaping chlorine would have had to pass. When the chlorine was completely added, the reaction mixture was agitated for 50 minutes at 25° C. The reaction was substantially complete at this time as evidenced by titrating an aliquot of the reaction mixture for chlorine content, according to known iodometric methods. The reaction mixture was then filtered to remove catalyst and was then washed with a 2% solution of sodium hydroxide and then with water. The solvent (carbon tetrachloride) was evaporated on a steam bath with the last traces thereof being removed under diminished pressure. The product was obtained in the amount of 36 parts containing 77.6% heptachlor, the remainder being essentially pure chlordane. It is useful as an insecticide without further treatment.

The amount of heptachlor in the final product can be determined without actually isolating it therefrom by the following method which is based on the fact that one chlorine atom in heptachlor will react with silver acetate under the conditions of the test to yield silver chloride, whereas the other component products of the present process are inert under those conditions.

In a 600 ml. beaker, 1.0 g. of silver acetate is dissolved in 200 ml. hot 80% acetic acid. An accurately weighed sample of about 1.0 gram chlorinated product is added and the beaker is covered with a watch glass, and the mixture is boiled gently on a hotplate for three hours. After digestion, the solution is allowed to come to room temperature and is then filtered through a previously weighed sintered glass funnel; the precipitate is washed once with a few ml. of acetic acid and thereafter with 95% ethanol until quantitatively transferred into a funnel. The precipitate is dried in an oven (130° C.) for one hour and then cooled in a desiccator.

The calculations are as follows:

Percent available chloride =

$$\frac{(\text{Wt. of AgCl})(0.2474)}{\text{Wt. of sample}} \times 100$$

Since one chlorine in heptachlor reacts, then:

Theoretical available chloride in heptachlor =

$$\frac{35.457}{373.33} \times 100 = 9.50\%$$

Percent heptachlor in sample =

$$\frac{\text{Percent available chloride}}{9.50} \times 100$$

*Example II*

This experiment is identical with Example I except that ground silica aerogel was used as catalyst. A chlorinated product was obtained in the amount of 36 parts and contained 75.4% heptachlor.

*Example III*

To illustrate the improved effect of my catalyst on the rate and amount of heptachlor produced in the chlorination of chlordene, the process of Example I was duplicated exactly except that catalyst was omitted. A sample of the reaction mixture withdrawn after one hour, upon analysis, indicated that only about one-third of the chlorine had reacted and the product at this stage contained only 22.8% heptachlor. A sample of the reaction mixture withdrawn after three hours, upon analysis, indicated that more than half of the chlorine had reacted and the product at this stage contained only 25.4% heptachlor. A sample of the reaction mixture withdrawn after five hours, upon analysis, indicated that while more than 75% of the chlorine had reacted, the product then contained only 29.75% heptachlor.

It is thus apparent that the use of silica catalyst directionalizes this chlorination reaction to increase the production of heptachlor, and simultaneously increases the rate very significantly.

The process of the present invention is advantageous in that it provides a rapid and flexible method for chlorinating chlordene to result in a reaction product mixture much more toxic to insects than that which results from the non-catalytic chlorination method. Further, the present process results in yields of heptachlor which are sufficiently great to allow, if desired, separation and purification of this main, toxic component by ordinary means. The present process therefor lends itself readily to the production of pure heptachlor, a highly toxic chlorinated derivative of chlordene. It will be noted that although heptachlor may be separated and formulated into insecticides in its pure form, the remainder of the chlorinated product consists preponderately of chlordane, which is itself a commercial insecticide having great value, although less than that of heptachlor. Hence, whether heptachlor is isolated or not, the total chlorinated product of the present process is valuable.

A beneficial result of directionalizing the chlorination of chlordene to produce increased yields of heptachlor is the increased toxicity of the product mixture. A comparison of the relative toxic properties of heptachlor, chlordane, and nonachlor, the three predominant components of chlorinated chlordene, illustrates this very clearly.

The three compounds above mentioned were individually dissolved in deobase (a deodorized kerosene) and applied as measured droplets to the head capsules of male and female German roaches. The dosage levels were calculated in terms of micrograms of toxicant per insect. Following is a table of the results obtained.

| Compound and Dosage in Micrograms Per Insect | Percent Mortality, Males | | | Percent Mortality, Females | | |
|---|---|---|---|---|---|---|
| | No. used | 24 Hrs. | 48 Hrs. | No. used | 24 Hrs. | 48 Hrs. |
| Heptachlor: | | | | | | |
| 0.43 | 40 | 70 | 95 | | | |
| 0.86 | 20 | 100 | 100 | 30 | 13 | 63 |
| 1.72 | 20 | 100 | 100 | 30 | 37 | 90 |
| Chlordane: | | | | | | |
| 0.86 | 20 | 25 | 75 | | | |
| 1.72 | 50 | 46 | 98 | 50 | 15 | 40 |
| 3.44 | 40 | 83 | 100 | 50 | 40 | 74 |
| 6.88 | 20 | 100 | 100 | 30 | 63 | 90 |
| Nonachlor: | | | | | | |
| 0.86 | 20 | 0 | 0 | | | |
| 1.72 | 30 | 10 | 17 | 40 | 3 | 3 |
| 3.44 | 40 | 10 | 40 | 30 | 30 | 33 |
| 6.88 | 20 | 20 | 70 | 30 | 40 | 40 |

In the above table, the percent mortality for both the male and female roaches was noted after a 24 and 48 hour period. It is known, and corroborated by these results that female roaches are more difficult to kill than are male roaches, and for that reason the tests are run on each sex individually. The results indicate that heptachlor is four times as toxic as chlordane, and chlordane is far more toxic than nonachlor. To obtain about the same percentage kill on male roaches at 48 hours (namely about 95%), four times as much chlordane was required as was heptachlor (0.43 microgram of heptachlor to 1.72 micrograms of chlordane). Similarly to obtain the same percentage kill on female roaches at 48 hours (namely about 90%), four times as much chlordane was required as was heptachlor (1.72 micrograms of heptachlor to 6.88 micrograms chlordane).

The great superiority of heptachlor over chlordane and other chlorinated products of chlordene such as nonachlor from a toxicity standpoint is well known and corroborated by many investigators. Heptachlor is further superior to chlordane and the like because, while it is sufficiently chlorinated to provide a favorable residual toxicity, it vaporizes at a sufficient rate to avoid leaving toxic residues on food products within a reasonable period after application thereof.

I claim as my invention:

1. The method of forming an insecticidal composition of matter characterized by a preponderant content of 1,4,5,6,7,8,8 - heptachloro - 3a,4,7,7a - tetrahydro - 4,7-methanoindene which comprises reacting chlorine with about equal molar quantities of 4,5,6,7,8,8-hexachloro-3a,4,7,7a-tetrahydro-4,7-methanoindene in a relatively inert solvent in the presence of a granular, adsorptive, porous silica catalyst possessing a relatively high ratio of surface to mass until substantially all the chlorine has reacted at a temperature between about 0° C. to about 30° C.

2. A method for chlorinating 4,5,6,7,8,8-hexachloro-3a,4,7,7a-tetrahydro-4,7-methanoindene which comprises reacting it with chlorine in a relatively inert solvent and in the presence of granular silica gel as a catalyst, at a temperature of from about −35° C. to about 50° C., until from about 0.75 to about 1.25 mole equivalents of chlorine have reacted per mole equivalent of said indene.

References Cited in the file of this patent

UNITED STATES PATENTS

| 908,051 | Voigt | Dec. 29, 1908 |
| 1,380,067 | Koch et al. | May 31, 1921 |
| 1,432,761 | Koch | Oct. 24, 1922 |
| 2,519,190 | Hyman | Aug. 15, 1950 |
| 2,576,666 | Bluestone et al. | Nov. 27, 1951 |